(12) United States Patent
Rust

(10) Patent No.: US 10,589,452 B2
(45) Date of Patent: Mar. 17, 2020

(54) METHOD FOR PROCESSING PRODUCTS IN AN EXTRUDER

(71) Applicant: Entex Rust & Mitschke GmbH, Bochum (DE)

(72) Inventor: Harald Rust, Bochum (DE)

(73) Assignee: Entex Rust & Mitschke GmbH, Bochum (DE)

( * ) Notice: Subject to any disclaimer, the term of this patent is extended or adjusted under 35 U.S.C. 154(b) by 256 days.

(21) Appl. No.: 15/569,844

(22) PCT Filed: Jun. 16, 2016

(86) PCT No.: PCT/EP2016/001014
§ 371 (c)(1),
(2) Date: Oct. 27, 2017

(87) PCT Pub. No.: WO2017/001048
PCT Pub. Date: Jan. 5, 2017

(65) Prior Publication Data
US 2018/0126623 A1   May 10, 2018

(30) Foreign Application Priority Data
Jul. 2, 2015 (DE) .......................... 10 2015 008 406

(51) Int. Cl.
*B29C 48/42* (2019.01)
*B29C 48/425* (2019.01)
(Continued)

(52) U.S. Cl.
CPC .......... *B29C 48/425* (2019.02); *B29C 48/022* (2019.02); *B29C 48/268* (2019.02); *B29C 48/38* (2019.02); *B29C 48/435* (2019.02); *B29C 48/44* (2019.02); *B29C 48/683* (2019.02); *B29C 48/688* (2019.02); *B29C 48/82* (2019.02); *B29C 48/92* (2019.02); *B29C 48/143* (2019.02); *B29C 48/144* (2019.02); *B29C 48/288* (2019.02); *B29C 48/297* (2019.02);
(Continued)

(58) Field of Classification Search
CPC ..................................... B29C 48/425
USPC ..................................... 366/83, 85
See application file for complete search history.

(56) References Cited

U.S. PATENT DOCUMENTS 1,356,296 A * 10/1920 La Casse ................ B29B 7/485
366/76.4
2,581,451 A * 1/1952 Sennet .................... B29B 7/485
366/85
(Continued)

FOREIGN PATENT DOCUMENTS

DE   68915788   10/1994
DE   69207369   6/1996
(Continued)

OTHER PUBLICATIONS

Istvan Benedek, Pressure-Sensitive Adhesives and Applications, pp. 161-166, 506, CRC Press, 2 edition, 2004.
(Continued)

*Primary Examiner* — David L Sorkin
(74) *Attorney, Agent, or Firm* — Smartpat PLC

(57) ABSTRACT

The invention relates to the production of PSA in a planetary gear extruder. During filling and after passing a passage on a dispersing ring using a lateral arm extruder, the products are degassed.

18 Claims, 2 Drawing Sheets

(51) Int. Cl.

| | | |
|---|---|---|
| *B29C 48/435* | (2019.01) | |
| *B29C 48/00* | (2019.01) | |
| *B29C 48/38* | (2019.01) | |
| *B29C 48/82* | (2019.01) | |
| *B29C 48/92* | (2019.01) | |
| *B29C 48/68* | (2019.01) | |
| *B29C 48/685* | (2019.01) | |
| *B29C 48/25* | (2019.01) | |
| *B29C 48/44* | (2019.01) | |
| B29C 48/14 | (2019.01) | |
| B29C 48/285 | (2019.01) | |
| B29C 48/76 | (2019.01) | |
| B29C 48/80 | (2019.01) | |
| B29K 21/00 | (2006.01) | |
| B29K 105/00 | (2006.01) | |
| B29K 7/00 | (2006.01) | |

(52) U.S. Cl.
 CPC ......... B29C 48/686 (2019.02); B29C 48/766 (2019.02); B29C 48/834 (2019.02); B29C 2948/92695 (2019.02); B29C 2948/92876 (2019.02); B29K 2007/00 (2013.01); B29K 2021/006 (2013.01); B29K 2105/0038 (2013.01)

(56) References Cited

U.S. PATENT DOCUMENTS

| | | | | |
|---|---|---|---|---|
| 2,802,238 | A * | 8/1957 | Colombo | A22C 11/08 366/85 |
| 3,310,837 | A * | 3/1967 | Wittrock | B29C 45/50 366/76.1 |
| 4,176,967 | A * | 12/1979 | Brinkmann | B29B 7/485 366/83 |
| 4,268,176 | A * | 5/1981 | Muller | B29B 7/485 366/83 |
| 4,303,344 | A * | 12/1981 | Muller | B29C 48/38 366/76.3 |
| 4,889,430 | A * | 12/1989 | Mueller | B29B 7/485 366/85 |
| 5,204,377 | A | 4/1993 | Fukawa et al. | |
| 5,346,963 | A | 9/1994 | Hughes et al. | |
| 5,356,574 | A | 10/1994 | Tamaki et al. | |
| 5,540,868 | A | 7/1996 | Stouffer et al. | |
| 5,550,186 | A | 8/1996 | Cantrill et al. | |
| 5,719,198 | A | 2/1998 | Young et al. | |
| 5,758,961 | A | 6/1998 | Deal et al. | |
| 5,776,887 | A | 7/1998 | Wibert et al. | |
| 5,798,175 | A | 8/1998 | Tynan et al. | |
| 5,814,714 | A | 9/1998 | Palomo et al. | |
| 5,922,473 | A | 7/1999 | Muthiah et al. | |
| 5,928,419 | A | 7/1999 | Uemura et al. | |
| 5,948,524 | A | 9/1999 | Seethamraju et al. | |
| 6,074,084 | A | 6/2000 | Kolossow | |
| 6,287,669 | B1 | 9/2001 | George et al. | |
| 6,303,071 | B1 | 10/2001 | Sugawara et al. | |
| 6,667,372 | B1 | 12/2003 | Miyake et al. | |
| 6,740,693 | B1 | 5/2004 | Gomy et al. | |
| 6,777,083 | B1 | 8/2004 | Mizota et al. | |
| 6,977,239 | B1 | 12/2005 | Weuthen et al. | |
| 7,049,279 | B1 | 5/2006 | Weuthen et al. | |
| 7,132,564 | B2 | 11/2006 | Gürtler et al. | |
| 2001/0023278 | A1 | 9/2001 | Rowland et al. | |
| 2003/0015814 | A1 | 1/2003 | Krull et al. | |
| 2003/0022809 | A1 | 1/2003 | Weuthen et al. | |
| 2003/0027741 | A1 | 2/2003 | Weuthen et al. | |
| 2003/0144172 | A1 | 7/2003 | Weuthen et al. | |
| 2004/0232578 | A1 | 11/2004 | Magni et al. | |
| 2005/0031855 | A1 | 2/2005 | Heuer et al. | |
| 2005/0100718 | A1 | 5/2005 | Peiffer et al. | |
| 2005/0100729 | A1 | 5/2005 | Peiffer et al. | |
| 2005/0100750 | A1 | 5/2005 | Peiffer et al. | |
| 2005/0118412 | A1 | 6/2005 | Peiffer et al. | |
| 2005/0121817 | A1 | 6/2005 | Konig et al. | |
| 2005/0121822 | A1 | 6/2005 | Peiffer et al. | |
| 2005/0158555 | A1 | 7/2005 | Anders et al. | |
| 2005/0173050 | A1 | 8/2005 | Peiffer et al. | |
| 2005/0272839 | A1 | 12/2005 | Bauer et al. | |
| 2006/0014857 | A1 | 1/2006 | Sapper et al. | |
| 2006/0029760 | A1 | 2/2006 | Kreft et al. | |
| 2006/0052472 | A1 | 3/2006 | Hansen et al. | |
| 2006/0084734 | A1 | 4/2006 | Bauer et al. | |
| 2006/0160938 | A1 | 7/2006 | Zierer et al. | |
| 2007/0027300 | A1 | 2/2007 | Zierer et al. | |
| 2007/0066708 | A1 | 3/2007 | Goldacker et al. | |
| 2007/0085231 | A1 | 4/2007 | Menges et al. | |
| 2007/0161746 | A1 | 7/2007 | Weber | |
| 2007/0191545 | A1 | 8/2007 | Heiliger et al. | |
| 2008/0269415 | A1 | 10/2008 | Spyrou et al. | |
| 2009/0048398 | A1 | 2/2009 | Zollner et al. | |
| 2009/0069465 | A1 | 3/2009 | Austrup et al. | |
| 2009/0298961 | A1 | 12/2009 | Baumgart et al. | |
| 2011/0230610 | A1 | 9/2011 | Schultes et al. | |
| 2015/0118352 | A1 * | 4/2015 | Visscher | B29C 48/04 426/3 |

FOREIGN PATENT DOCUMENTS

| | | |
|---|---|---|
| DE | 69306874 | 7/1997 |
| DE | 69312246 | 8/1997 |
| DE | 69312852 | 1/1998 |
| DE | 68928567 | 8/1998 |
| DE | 69419146 | 10/1999 |
| DE | 19856235 A1 | 5/2000 |
| DE | 19939075 A1 | 2/2001 |
| DE | 19953793 A1 | 5/2001 |
| DE | 19953796 A1 | 5/2001 |
| DE | 19954313 A1 | 5/2001 |
| DE | 19956483 A1 | 6/2001 |
| DE | 19956802 A1 | 6/2001 |
| DE | 19956803 A1 | 6/2001 |
| DE | 19958398 A1 | 6/2001 |
| DE | 19960494 A1 | 6/2001 |
| DE | 19962859 A1 | 7/2001 |
| DE | 19962883 A1 | 7/2001 |
| DE | 19962886 A1 | 7/2001 |
| DE | 69427539 | 7/2001 |
| DE | 69428309 | 10/2001 |
| DE | 10048028 A1 | 4/2002 |
| DE | 69709015 | 5/2002 |
| DE | 69622375 | 8/2002 |
| DE | 69707763 | 8/2002 |
| DE | 69711597 | 10/2002 |
| DE | 69715082 | 10/2002 |
| DE | 69715781 | 10/2002 |
| DE | 69710878 | 11/2002 |
| DE | 69807708 | 1/2003 |
| DE | 69725985 | 12/2003 |
| DE | 69628188 | 4/2004 |
| DE | 69908565 | 5/2004 |
| DE | 10257377 A1 | 7/2004 |
| DE | 19518255 | 7/2004 |
| DE | 60012108 | 8/2004 |
| DE | 69630762 | 9/2004 |
| DE | 10333927 A1 | 2/2005 |
| DE | 10334343 A1 | 2/2005 |
| DE | 10355748 A1 | 3/2005 |
| DE | 10340976 A1 | 4/2005 |
| DE | 10340977 A1 | 4/2005 |
| DE | 10343964 A1 | 4/2005 |
| DE | 10345043 A1 | 4/2005 |
| DE | 10349144 A1 | 5/2005 |
| DE | 10352430 A1 | 6/2005 |
| DE | 10352431 A1 | 6/2005 |
| DE | 10352432 A1 | 6/2005 |
| DE | 10352439 A1 | 6/2005 |
| DE | 10352440 A1 | 6/2005 |
| DE | 10352444 A1 | 6/2005 |
| DE | 10354379 A1 | 6/2005 |
| DE | 10354546 A1 | 6/2005 |
| DE | 102004048440 A1 | 6/2005 |

(56) References Cited

FOREIGN PATENT DOCUMENTS

| | | |
|---|---|---|
| DE | 102004048794 A1 | 6/2005 |
| DE | 10356821 A1 | 7/2005 |
| DE | 102004002159 A1 | 8/2005 |
| DE | 102004004230 A1 | 8/2005 |
| DE | 102004005058 A1 | 8/2005 |
| DE | 102005007952 A1 | 9/2005 |
| DE | 102004023085 A1 | 12/2005 |
| DE | 102004026799 A1 | 12/2005 |
| DE | 69827497 | 1/2006 |
| DE | 102004032694 A1 | 2/2006 |
| DE | 102004038774 A1 | 2/2006 |
| DE | 102004044085 A1 | 3/2006 |
| DE | 102004044086 A1 | 3/2006 |
| DE | 102004046228 A1 | 3/2006 |
| DE | 102004048773 A1 | 4/2006 |
| DE | 102004048875 A1 | 4/2006 |
| DE | 102004050058 A1 | 4/2006 |
| DE | 60206271 | 6/2006 |
| DE | 102004060966 A1 | 6/2006 |
| DE | 102004061068 A1 | 7/2006 |
| DE | 102004061185 A1 | 7/2006 |
| DE | 102004053929 | 3/2007 |
| DE | 102006001171 A1 | 4/2007 |
| DE | 102006002176 A1 | 7/2007 |
| DE | 10351463 | 8/2007 |
| DE | 102006033089 A1 | 10/2007 |
| DE | 10054854 | 1/2008 |
| DE | 102004034039 | 4/2008 |
| DE | 102006054204 A1 | 5/2008 |
| DE | 102004004237 | 7/2008 |
| DE | 102008018686 A1 | 10/2009 |
| DE | 19852493 | 4/2010 |
| DE | 10066229 | 9/2010 |
| DE | 102009013839 A1 | 9/2010 |
| DE | 202011104061 U1 | 10/2011 |
| DE | 102010026535 A1 | 1/2012 |
| DE | 102010030706 A1 | 1/2012 |
| DE | 102010049392 A1 | 4/2012 |
| DE | 102012008169 A1 | 10/2013 |
| DE | 10342822 | 9/2014 |
| GB | 2407047 C | 9/2007 |
| JP | H11198214 A | 7/1999 |
| JP | H11216765 A | 8/1999 |
| WO | 9833858 | 8/1998 |

OTHER PUBLICATIONS

Michael W Batton, Thomas J Malzahn, Michael Gerdon, Ralf Quack, An introduction of the planetary roller extruder and areas of applications rubber devulcanization, ANTEC® 2015—Proceedings of the Technical Conference & Exhibition, Orlando, Florida, USA Mar. 23-25, Mar. 1, 2015.

* cited by examiner

METHOD FOR PROCESSING PRODUCTS IN AN EXTRUDER

TECHNICAL FIELD

The invention relates generally to a method for processing products in an extruder and more specifically to a method for processing elastomers, in particular PSA (Pressure-Sensitive Adhesives) made of elastomers, in an extruder.

BACKGROUND

The invention relates to a method for processing elastomers, in particular PSA (Pressure-Sensitive Adhesives) made of elastomers, cf. "pressure-sensitive adhesives and applications" Istvan Benedek, Edition 2004, pages 161 et seq. The most frequently used elastomers are rubbers. However, styrene-butadiene polymers or acrylic polymers are also used. Such products have to be initially masticated before they can be blended with other materials. To masticate these elastomers, it is known to process them mechanically and/or chemically. Elastomers possess different characteristics that depend on their origin and basis. The higher the molecular weight of the elastomer, the more difficult the mastication becomes. Mastication is required in order to blend in additives, and also to be able to discharge the elastomers through a die.

In the past, kneaders have been used for the mastication. With kneaders the molecular weight of the elastomers is greatly reduced by severe mechanical deformation in the presence of oxygen and with strong heating. However, the properties of the elastomers are greatly modified by the reduction in the molecular weight, thereby leading to an increasingly difficult production of the adhesive.

Moreover, the kneaders operate only in a batch mode. The kneaders possess a housing, in which one or more mixing arms move. In order to provide a continuous material flow with kneaders a plurality of kneaders are required which continuously provide masticated elastomers.

The mastication may be supported by chemical agents. The chemical agents are generally undesirable after mastication. Their separation and removal from the resulting material is complex and difficult. Frequently the chemical agents partially remain in the material and impair its quality.

Planetary roller extruders have recently been recommended for the mechanical processing. The planetary roller extruder provides an unequalled gentler treatment of the elastomers in comparison to a kneader or conventional rollers. In the kneader and on conventional rollers the temperature cannot be controlled as well as in the planetary roller extruder. In the kneader and on conventional rollers the ambient air has unimpeded access, such that a considerable number of broken-down molecular structures can bond with the oxygen from the air, thereby creating a considerable disadvantage for subsequent processing of the elastomers.

Moreover, a planetary roller extruder is inherently designed for continuous operation, thereby obviating the need for a plurality of kneaders operating in parallel to produce a continuous material flow.

A planetary roller extruder possesses a central spindle, an inner-toothed housing, and various planetary spindles between the inner toothing of the housing and the planetary spindle. The planetary spindles mesh with both the central spindle as well as with the inner-toothed extruder housing. In this regard the planetary spindles rotate around the central spindle. Inside the housing is a thin liner that is equipped on the inside with toothing and is heated or cooled on the outer side. For this, a tempering fluid is fed along the exterior of the liner. Moreover, the central spindle may also be provided with a temperature control.

The processing of the elastomers and their blending with other substances can be substantially influenced by the type and number of the planetary spindles.

In regard to the details and variations of known planetary roller extruders and their sections/modules, reference is made to the following publications: DE102005007952A1, DE102004061068A1, DE102004038875A1, DE102004048794A1 DE102004048773A1, DE102004048440A1 DE102004046228A1, DE102004044086A1, DE102004044085A1, DE102004038774A1, DE102004034039A1, DE102004032694A1, DE102004026799 B4, DE102004023085A1, DE102004004230A1, DE102004002159A1, DE19962886A1, DE19962883A1, DE19962859A1 DE19960494A1, DE19958398A1, DE19956803A1, DE19956802A1, DE19953796A1, DE19953793A1.
Degassing procedures are described in some of the publications. Partial or complete degassing releases unwanted gas from the material enclosed in the extruder.

Other degassing procedures are described in the following publications: DE102004061185A1, DE102004060966A1, DE102004053929A1, DE1020040050058A1, DE102004004237A1, DE69908565T2, DE69827497T2, DE69807708T2, DE69725985T2, DE69715781T2, DE69715082T2, DE69711597T2, DE69710878T2, DE69709015T2, DE69707763T2, DE69630762T2, DE69628188T2, DE69622375T2, DE69428309T2, DE69427539T2, DE69419146T2, DE69312852T2, DE69312246T2, DE69306874T2, DE69207369T2, DE68928567T2, DE68915788T3, DE60206271T2, DE60012108T2, DE19956483A1, DE19954313A1, DE10257377A1, DE10356821A1, DE10354546A1, DE10354379A1 DE10352444A1, DE10352440A1, DE10352439A1, DE10352432A1, DE10352431A1, DE10352430A1, DE10351463A1, DE10349144A1, DE10345043A1, DE10343964A1, DE10342822A1, DE10340977 B4, DE10340976 B4, DE10333927A1.

A single extruder may be sufficient for a continuous processing in the extruder. The modern modular design advantageously enables a plurality of identical or different modules to be assembled one behind the other, thereby permitting the material to be processed in a desired manner.

With the materials considered here, the mechanical processing is a significant component of the material processing. In this regard the material is repeatedly rolled out between the intermeshing rolling teeth of the planetary roller extruder. The large number of roller operations is due to the number of revolutions of the central spindle and the thus dependent revolutions of the planetary spindles. The material is thus very thinly rolled out dependent on the toothing. This causes an intensive kneading of the material. This kneading masticates the solid material, such as for example rubber, which is fed in particulate form to the planetary roller extruder.

SUMMARY

The object of the invention is to improve the processing of rubber and other similar materials. This is achieved with the features of the main claim. The dependent claims describe preferred embodiments of the invention.

The invention is based on the following understanding: mastication may be carried out in the presence of oxygen or under the exclusion of oxygen. Oxygen is excluded by means of an inert gas, such as for example nitrogen or carbon dioxide. Because ambient air comprises oxygen in addition to other substances; the presence of oxygen already occurs when ambient air is entrained with the material into the extruder.

The presence of oxygen may even be increased by metering in oxygen.

The amount of oxygen may also be limited by metering in low amounts of inert gas.

In cases where the mastication occurs with molecular degradation, some of the oxygen becomes attached to the atoms and thus influences the material properties, and in due course also the subsequent material processing/material treatment. This also applies to a crosslinking of the molecules after exiting the extruder. Molecules with atoms that are bonded to oxygen atoms undergo crosslinking with other molecules only to a limited extent.

The molecular degradation according to the invention is dependent on the intended application of the material, in particular of the rubber or other synthetic elastomers, and depends on the initial molecular weight of the rubber or of the other synthetic elastomers, and is dependent on the particular application. Insofar as the term rubber is mentioned then it is understood hereinafter to mean natural rubber. Hereinafter, synthetic rubbers are assigned to the group of the other elastomers, wherein synthetic elastomers may be produced with properties that are comparable with those of the (natural) rubber or in other processes with properties that are not comparable to those of (natural) rubber.

Natural, non-thermoplastic elastomers. They are found with different characteristics,
  with an average molecular weight of less than/equal to 1,000,000
  with an average molecular weight of more than 1,000,000 up to 2,000,000
  with an average molecular weight of more than 2,000,000

The lower the initial molecular weight of the rubber, the more expensive is the rubber or comparable synthetic elastomer.

At the same time it should be taken into account that different quality requirements apply for the various applications of rubber and comparable elastomers. In the field of adhesives, those used in everyday life are differentiated from the high-quality adhesives.

Exemplary adhesives used in everyday life include adhesive tapes for packaging which after use are disposed of with the packaging.

Such an application preferably involves the use of cheap, high molecular weight rubbers or comparable cheap elastomers. Mastication of such elastomers to incorporate other adhesive components with comparable handling would require much more effort. The following can be of help:
  intensive mechanical deformation regardless of molecular degradation
  processing at least under ambient air, optionally also with added oxygen, regardless of the extent to which subsequent crosslinking would be possible
  exposing the elastomers to significant heating, regardless of the consequences on molecular degradation
  chemical mastication auxiliaries, in particular solvents.

Mastication auxiliaries such as solvents cannot be completely removed from the mixture after all the adhesive components have been incorporated. The removal is usually carried out by means of degassing. Residual solvents in the compound result in a lower quality adhesive that may, however, still be useful in simple applications, such as for example in packaging.

Exemplary high-value adhesives include adhesive tapes with a heat-stable adhesive, and also adhesive tapes with adhesives that can be removed from an object without leaving a residue. The invention has recognized that an important requirement for such high-value adhesives is a solvent-free production. This also applies to other chemical auxiliaries that impair the properties of rubber or comparable elastomers. This also applies to mastication in the presence of oxygen and a thereby associated partial oxidation.

According to the invention natural rubber is masticated in a planetary roller extruder and with a dispersion ring, the compound being cooled until it exhibits a Mooney viscosity of a certain magnitude. To apply this technology to the production of high-value adhesives the rubber is inventively processed as dry as possible in the planetary roller extruder. According to the invention the resins and oils and other liquid, innocuous additives such as liquid slip agents for the rubber, are masticated in the planetary roller extruder in amounts of less than/equal to 15 wt %, based on the mixture with the rubber, preferably in amounts of less than/equal to 13 wt %, even more preferably in amounts of less than/equal to 11 wt % and most preferably in amounts of less than/equal to 9 wt %, based on the mixture with the rubber. In this regard it may be advantageous to initially pre-heat the rubber prior to blending it with the prescribed liquid components. The pre-heating is even more preferably carried out in the feed part, thus ensuring that the added melted resins do not partially lose their heat to the rubber and lead to their lubricating action being partially diminished.

Moreover, oxygen is most preferably at least partially excluded during the mastication. This also applies to the pre-heating in the feed part that is under inert gas in order to essentially exclude adverse effects of the atmospheric oxygen.

Any other required components of the adhesive mixture are advantageously metered in after the rubber has been masticated. In comparison to a metering together with the rubber, this has the advantage that the mastication of the rubber cannot be perturbed by the other components of the mixture.

Liquid and molten components of the adhesive can be added by injection. The required injection ports can be arranged in the extruder casing at the point where an adequate mastication can be determined by the viscosity measurement according to the invention.

In the simplest case the injection ports are formed by bore holes that project through the extruder casing/housing into the inner space of the extruder. The liquid and molten components of the adhesive are supplied through suitable pipes that are flanged onto the extruder casing/housing.

With a modular extruder design the liquid and molten components of the adhesive are preferably injected through an annular construction arranged between two modules. The extruder modules generally possess a housing that is equipped on each end with a flange. The housings are clamped together at the flanges. A ring can be very advantageously clamped between the flanges. The ring is equipped with bores and/or grooves through which liquid and molten components of the adhesive are introduced into the inner volume of the extruder. The liquid and molten components of the adhesive are conveyed through piping or hose lines, which protrude into the free volume between the housing flanges and supplied with the liquid and molten components of the adhesive by suitable pumps.

At least one side-arm extruder is preferably provided to feed further components of the mixture into the extruder or extruder module. Such side-arm extruders may also be utilized, for example, to melt resins that are to be fed into the extruder. The side-arm extruders may also be utilized as pumps in order to feed liquid or molten components of the mixture into the extruder. In particular, side-arm extruders in the form of twin-screw extruders are suitable for feeding solids, such as for example fillers. This applies both to mixtures of solids and liquid substances as well as to the exclusive feed of solids.

Side-arm extruders are also designated as side-arm extruders when they are not arranged laterally on the extruder side but rather on top of or underneath the extruder. To compound fillers and other components of a desired elastomer mixture in the planetary roller extruder the rubber and the other non-thermoplastic elastomers are masticated to the extent that they exhibit a Mooney viscosity of less than 80, preferably less than 70 and even more preferably less than 60 and most preferably less than 50.

This may be carried out wholly or partially outside the planetary roller extruder. It may also be carried out exclusively in the planetary roller extruder.

However, this does not exclude a partial mastication of the rubber or comparable elastomers in a preliminary process. The partial mastication in the preliminary process can be carried out by conventional mastication in a kneader or in a rolling stand. However, the rubber or comparable elastomers are preferably pre-prepared in a pin extruder.

In fact, rubber with a molecular weight of more than 2,000,000 can also be masticated exclusively in the planetary roller extruder, with or without mastication auxiliaries.

Preferably, however, only rubber or a comparable elastomer is employed with an average molecular weight of up to 2,000,000, even more preferably with an average molecular weight up to 1,500,000 and most preferably with an average molecular weight up to 1,000,000.

This can concern a rubber or comparable elastomer that has been pre-treated to afford the desired molecular weight or concerns a rubber resulting from an appropriate selection of a low molecular weight starting latex or from the corresponding composition of comparable synthetic elastomers.

In addition, the mastication according to the invention of rubber and comparable elastomers is carried out according to the quality requirements. Thus, significantly lower requirements are placed on rubber and comparable elastomers for their use as everyday adhesives than for their use as high-value adhesives. In the case of production of adhesives for everyday use the mixture may also comprise solvents and other components that facilitate the mastication of rubber for blending in the components of the adhesive.

In the case of production of high-value adhesives, the use of solvents, which would otherwise significantly impair the adhesion characteristics, should be particularly avoided.

Likewise, the presence of oxygen should be avoided when producing high-value adhesives.

Moreover, according to the invention the mastication is carried out at the lowest possible temperature. This is based on the finding that each passage through an extruder, even through planetary roller extruders, indeed leads to a molecular degradation, but an adequate mastication with a different molecular degradation can be achieved.

According to the invention the molecular degradation during the mastication is reduced as much as possible in the planetary roller extruder, such that the processed rubber or the processed elastomer, in spite of the mastication and blending with all the required additives, exits the extruder with a higher molecular weight than when processed in other extruders.

In this regard it is important to work with the lowest possible compound temperature in the mastication zone. This temperature is sufficiently far below the temperature, at which a molecular degradation is initiated in the presence of ambient air in the absence of mechanical deformation and without chemical mastication aids. Sufficiently far is for example a temperature difference of at least 10° C., preferably at least 20° C., even more preferably at least 30° C. and most preferably at least 40° C.

In the case of natural rubber this is a temperature below 140° C., preferably below 130° C., even more preferably 120° C. and lower. Natural rubber, for example, can be masticated with a compound temperature of 100 to 120° C.

Other rubbers may be processed with another temperature, for example with a temperature of 160 to 170° C. for synthetic butyl rubber. These temperatures are comparably far below the temperatures, at which a molecular degradation of butyl rubber is initiated in the presence of ambient air in the absence of mechanical deformation and without chemical mastication aids.

In the absence of solvents and similar mastication auxiliaries the planetary roller extruder must generate more mastication work than for the production of the adhesives used in everyday life. Dispersion rings, mentioned below, are particularly helpful for such processing procedures.

The mastication according to the invention in the planetary roller extruder and with a dispersion ring and with cooling may also be used for adhesives of everyday life, also for low-cost rubber and elastomers with a high molecular weight. In this regard, molecular degradation at higher temperatures and/or molecular degradation by mastication under oxygen and/or molecular degradation by chemical mastication agents may be carried out, as required. The use according to the invention of mastication with a dispersion ring enables low-cost, high-molecular weight elastomers to be better masticated even with the conventional use of heat, oxygen and chemical mastication agents.

Insofar as an oxidation of the rubber or the elastomer is desired, then oxygen can be introduced at various locations into the extruder.

The oxygen is preferably introduced by enriching the air with oxygen in the feed hopper of the feed part or in the feed part itself, as long as the perturbation associated with the oxygen flow can be overcome with a crammer device/crammer unit.

If the entry of oxygen is intended to be prevented with an inert gas, then the inert gas is also preferably supplied in the feed hopper of the feed part or in the feed part itself, as long as the perturbation associated with the inert gas flow can be overcome with a crammer device/crammer unit.

The crammer device can have various designs. For a required low conveying action an agitator arm suffices, on which an appropriately inclined paddle provides a low conveying action. A plurality of such agitator arms can be provided when a greater conveying action is required. A crammer unit designed as a single-screw extruder or designed as a twin-screw extruder can be provided when an even greater conveying action is required. The crammer unit designed as a single-screw extruder or twin-screw extruder also enables finely ground/powdery solids to be introduced into the feed part if the solids are conveyed with a gaseous carrier medium to the feed hopper above the feed part. The solids preferably separate from the gaseous carrier medium in the feed hopper. The gaseous carrier medium is stripped away. A crammer unit conveys the solids into the feed part.

If an adequate material feed cannot be ensured, even with the crammer device/crammer unit, then the oxygen can be injected into the feed part itself.

Oxygen is preferably added as long as the material entrained into the feed part still remains loosely bulked and the supplied oxygen can permeate the bulk material. For example this is the case in the feed part directly below the feed hopper.

The supply of inert gas is carried out in the same way as for the oxygen supply.

Mastication and a required molecular degradation can be strongly influenced by the processing temperature/working temperature in the extruder. The higher the temperature, the greater the molecular degradation.

The molecular degradation manifests itself by a reduced molecular weight. The mastication affords a desired free-flow of the material. The free-flow enables property-changing substances to be blended in, as well as fillers that are intended to modify the properties as little as possible, but which provide an economic advantage to the mixture.

The mechanical processing can be supported by slip agents. In this regard liquids are preferably used. However, in the majority of cases, lubricants are not wanted in the finished product. The removal of the lubricant is facilitated by the use of a liquid lubricant that after heating can escape from the mixture in the course of the degassing.

Chemical mastication is generally only carried out to complement the mechanical mastication. Common chemical mastication agents are listed for example in "Pressure sensitive adhesives and applications" Istvan Benedek, Ed. 2004, page 506. Chemical mastication agents generally have to be removed.

Liquid chemical mastication agents can be removed, as for the liquid slip agents, by degassing.

There are also other processes, in which degassing is highly important. They include material drying if moisture in the material is disadvantageous for the quality of the extrudate.

Degassing may also be carried out in chemical processes, in which a reaction is produced in the extruder, thereby affording a liquid or gaseous phase. The liquid phase to be removed is then preferably converted into a gaseous state, in which it can be easily drawn off.

Gases may also result or be added as process gases when chemical reactions proceed in the extruder. Excess or unreacted process gases then also have to be removed. In general, the same also applies to gases generated in the process. Unwanted process gases are similarly removed by degassing.

However, propellant gases for the production of plastic foam are to be differentiated from unwanted process gases. Propellant gases remain in the melt until the melt exits the extruder into an atmosphere of much lower pressure (for example ambient pressure). The gas enclosed in the melt then expands and, depending on the amount of gas, more or fewer foam cells are formed. This gas is called a propellant. The foam formation is preferably controlled such that the foam extrudate, on exiting the extruder into ambient air, solidifies on the outside to form a skin. The gas enclosed in the closed foam cells remains to a greater or lesser degree in the cells depending on the conditions. Depending on the conditions a greater or lesser part of the gas (propellant) diffuses out of the foam and is replaced by inwardly diffusing ambient air. In this regard, it is desirable that as much of the outwardly diffusing gas as possible is replaced by the inwardly diffusing ambient air. With only a partial replacement of the gas the foam volume is reduced under the ambient pressure. This is denoted as a shrinkage of the foam.

The propellant is preferably injected in liquid form into the extruder when the feedstock is appropriately prepared. In this regard, the preparation of the feedstock includes degassing, insofar as unwanted gaseous components have accrued during the processing of the feedstock. This may lead to the feedstock being degassed during its preparation, and another gas, namely the propellant, is then supplied.

Various processes and devices are known for degassing. These include multiple degassing and back venting in the planetary roller extruder.

Multiple degassing involves the extruder being simultaneously degassed at various points. The modular design of the planetary roller extruder is highly advantageous for this. The various modules are usually arranged in series and clamped together. Degassing rings, traversed by degassing channels, can be inserted between the various modules and are connected through openings in the rings to the interior of the extruder module. Moreover, the degassing rings are connected to an induced draft, such that gas can be stripped away from the interior of the extruder module.

The multiple degassing can also be realized by installing degassing holes at any position on the module cladding. The multiple degassing, the modular design of the extruder and the use of compatible modules enable degassing at all desired positions.

Back venting is a degassing that is specific to the planetary roller extruder. The melt-free volume in the extruder module is used for the degassing. The melt-free volume is formed in the planetary roller extruder module on the inlet side because the planetary roller extruder modules are always only partially filled and the melts in the interior of the module are conveyed in the outlet direction by the central spindle, planetary spindles and inner toothing of the housing.

Degassing systems for the feed part have also been developed. The degassing, when filling starting material into the feed part of the extrusion unit, involves separating the entrained air from the starting material, as well as optionally separating the specific gases used for the material transport from the starting material. In this type of degassing the entrained air/gas is stripped away from the starting material through filters prior to entering the extruder.

Here, there are different designs for the degassing. Air locks are optionally provided, as are described in DE10334343. In the majority of cases this concerns superimposed funnel-shaped chambers with a passage from the upper chamber into the lower chamber with a slider in the passage as well as a slider on the filling opening of the upper chamber. The lower chamber is equipped with a dosing device.

When the filling opening is opened and the passage is closed by the slider the material destined for the extrusion is metered into the upper chamber. When the desired fill level is reached the slider on the filling opening of the upper chamber is closed and the air enclosed in the upper chamber is stripped away to an economically reasonable extent by means of an induced draft. In this regard it is advantageous when initially a reduced pressure is continuously generated in a higher capacity pressure vessel; after the upper chamber has been closed it is connected to this pressure vessel by opening a slider in a connecting pipe. In this way air flows out of the upper chamber into the pressure vessel until a desired reduced pressure results with respect to the surroundings. The lower the air pressure in the pressure vessel, the faster the desired reduced pressure is reached in the upper chamber. The connection is then interrupted by closing the slider. As the air flows out of the upper chamber into the pressure vessel the induced draft keeps running to reduce the air pressure in the pressure vessel.

The capacity (interior volume) of the pressure vessel is preferably at least double, even more preferably at least triple and most preferably at least four times greater than the capacity of the upper chamber.

After the desired reduced pressure is obtained the slider in the passage to the lower chamber is opened, such that the material destined for extrusion can flow out of the upper chamber into the lower chamber. As needed, this may be controlled by a dosing unit. The material is continuously metered into the extruder from the lower chamber. In parallel to the material being drawn off from the lower chamber, the upper chamber is re-filled and a reduced pressure is generated there.

In order to prevent material being entrained with the air as the air is stripped out of the upper chamber, a filter is preferably provided at the outlet opening of the upper chamber.

The starting material isolated on the filter either drops down under its own weight from the filling opening or is removed from the filter with a rotating screw or with the aid of another moving filling auxiliary.

In this regard one may also work with a material layer on the filter which advantageously complements the filter. This means, the thicker the material layer on the filter, the less material can pass through this layer. The material layer on the filter then similarly causes the material to separate out of the extracted air. The continuous removal of material with the cited tools allows the layer thickness on the filter to be controlled, such that an effective material layer is present and at the same time the extraction of air is not prevented.

Optionally, the stripping tools in the upper chamber are also alterable, such that the thickness of the material layer and the filtering action of the material layer is adjustable.

When it is intended to work without stripping tools the material collected on the filter (on the material side) can be periodically blown off by a short blast of compressed air on the side (clean side) facing away from the separated material. A short blast of compressed air can be harmless for the operation of the filter. The blown-away material then falls downwards. In this case, a plurality of air-extraction openings with filters are preferably distributed on the upper chamber and exposed to the induced draft through corresponding connecting pipes. Furthermore, sliders are then provided on the various pipes, such that each time a filter is cleaned with a blast of compressed air, air extraction with a filter can be simultaneously activated at another position on the upper chamber.

Cyclone filters or drum filters may also optionally be used in the upper chamber. With these filters the compressed air, loaded with material, is rotated. This produces an air jet. The material, due to its weight or its mass, is collected on the outer edge of the air jet. In the center of the jet the air is essentially free of material and can be extracted.

A cyclone filter or drum filter may also be optionally combined with a conventional filter screen.

Instead of air other gases may also exist as the carrier medium and are to be separated from the material, for example if the material had been transported with inert gas, or if the bulk material comprises process gases. The degassing in the feed area is then preferably carried out in the same way as for air.

For details of known developments, reference is made to the following publications: DE10048028, DE10054854, DE10066229, DE19518255, DE19852493, DE19856235, DE102006001171, DE102006002176, DE102006033089, DE102006054204, DE102008018686, DE102010026535, DE102010030706, DE102010049392, DE102012008169.

A particular degassing is preferably achieved by applying degassing at the feed part and by a subsequent degassing by means of a side-arm extruder.

The side-arm extruder is flanged on at a desired position on the extruder housing. The side-arm extruder is itself intended to feed additional materials. A corresponding opening for this exists in the extruder housing. However, if the side-arm extruder is configured as a twin-screw extruder or as a planetary roller extruder, then this extruder may also be utilized for degassing. This extruder is then left to run empty. Left to run empty means: the side-arm extruder does not introduce any material into the extruder. At the same time a lower pressure is applied to the side-arm extruder.

The advantage of this process is that the melt pressure in the extruder does not have to be reduced for degassing at the degassing position. With other degassing processes the melt pressure is reduced in order to prevent an (excessive) amount of the melt from escaping. A slight amount of escaped melt can be collected with a degassing dome. The escaped melt is collected in the degassing dome and can flow back again into the extruder.

The side-arm extruder utilized for the degassing pushes the escaping melt back into the extruder, whereas the released gas can escape. A suction line attached to the side-arm extruder removes the escaping gas. Side-arm extruders are usually arranged horizontally. In this configuration the side-arm extruder can also be utilized for degassing. Better degassing results are obtained with a configuration, in which the side-arm extruder used for the degassing is above the planetary roller extruder.

The side-arm extruder is preferably mounted in an upright position on the planetary roller extruder. Particularly good degassing results are obtained when the side-arm extruder is placed vertically on the planetary roller extruder.

Still one or more additional degassing positions on the extruder optionally follow the side-arm extruder utilized for the degassing. There can be different reasons for this. Degassing through the side-arm extruder may be preceded by the degassing at the feed part or at other points of the extruder.

Degassing by means of the side-arm extruder is preferably carried out after the mastication of the elastomers.

The processing of the elastomers in the planetary roller extruder is decisive for the mastication. Insofar as mastication with a single planetary roller extruder or planetary roller extruder section already affords a viscosity that lies within the above reiterated limits according to the invention, then an additional mastication of rubber and comparable elastomers is unnecessary, because the prerequisite for mixing additional components of the mixture already exists.

If the limit values of viscosity according to the invention are not achieved, then the length of the planetary roller extruder can be increased. Lengthening the planetary roller extruder lengthens the processing duration, if other conditions remain the same. The duration of processing is an important factor for the mastication. The usual duration of processing can be read off for the usual module lengths of planetary roller extruder modules with a modular design of the unit. The usual length is about 400 mm. About means plus/minus 10%, preferably plus/minus 5%. The length is essentially independent of the construction size. Depending on the construction size the planetary roller extruders are moved in the usual manner. The movement is measured by the rotational speed of the central spindle. The usual rotational speed of the central spindle decreases with increasing construction size. The construction size data usually correspond to the pitch diameter of the inner toothing of the housing surrounding the central spindle.

The general conditions also include the tooth module that is used.

The standard designs are usually:

| Construction size | Tooth module | Speed of the central spindle rpm (revolutions per minute) |
| --- | --- | --- |
| 70 mm | 2.5 | up to 220 |
| 100 mm | 3 | up to 220 |
| 120 mm | 3 | up to 220 |
| 150 mm | 3 | up to 115 |
| 180 mm | 3.5 | up to 80 |
| 200 mm | 3 up to 3.5 | up to 80 |
| 250 mm | 3 | up to 80 |
| 300 mm | 3.5 | up to 80 |
| 400 mm | 3.5 | up to 80 |

Heavy duty designs for the planetary roller extruders usually have the following construction sizes:

| Construction size | Tooth module | Speed of the central spindle |
| --- | --- | --- |
| 280 mm | 5.5 | up to 80 |
| 300 mm | 5.5 | up to 80 |
| 400 mm | 5.5 | up to 80 |
| 500 mm | 5.5 | up to 80 |

According to the invention, a planetary roller extruder with a processing length in the mastication section of more than 400 mm is used for processing rubber or comparable elastomers with a molecular weight of more than 500,000, preferably more than 1,000,000 and even more preferably more than 1,500,000. The processing length in the mastication section may also be more than 600 mm or even more than 800 mm.

With the modular extruder design the mastication section is lengthened by attaching one or more planetary roller extruder modules onto the at least one planetary roller extruder module. This usually requires a longer central spindle in addition to the housing section(s) and planetary spindles of the additional planetary roller extruder modules. A one-piece central spindle therefore involves a new production of the central spindle. For multi-part central spindles with toothing sleeves that are seated on a shaft and clamped together over the shaft, the cost is limited to the required additional sleeves and a longer shaft.

According to the invention, a significant part of the mastication is provided by a dispersion ring. The dispersion ring is arranged between two adjacent planetary roller extruder modules or at the beginning of an extruder module or at the end of a planetary roller extruder module. In all cases the dispersion ring is located outside the movement path of the rotating planetary spindles. When a single planetary roller extruder module is provided for the mastication section a dispersion ring may be placed in front of and behind the single planetary roller extruder module or only behind or only in front of the planetary roller extruder module.

Optionally, dispersion rings may be used in a plurality of ways for the mastication: In the case where the mastication section consists of two planetary roller extruder modules, arranged one behind the other, a dispersion ring can be located:

upstream of the first or the second module or in front of the first module or behind both modules or when two dispersion rings are used one dispersion ring can be in front of the first module and one dispersion ring behind the first module or each dispersion ring can be located behind each module or one dispersion ring can be in front of the first module and one dispersion ring behind the second module.

The dispersion ring in the mastication section serves to reduce the cross sectional flow of the rubber or the elastomers to such an extent that when the rubber or the elastomers pass the dispersion ring they are subjected to a severe mechanical deformation that significantly contributes to the mastication of the rubber or the comparable elastomers.

The dispersion ring preferably engages into a groove of the central spindle, wherein the groove leaves open a defined gap for the passage of the elastomers, i.e. the width of the groove is more than the width of the dispersion ring and the depth of the groove is greater than the penetration depth of the dispersion ring. The gap, at least at the entrance for the feedstock, preferably exhibits a broadening, such that the rubber or the elastomers are increasingly compressed the further they penetrate into the tapered gap. After reaching a gap width (shown further below) the width may then remain constant and the compression makes a considerable contribution to the mastication of the rubber or elastomer.

The gap may also taper from the upstream side of the dispersion ring towards the downstream side.

The gap may optionally be wider at the end. This has the advantage of a controlled flow without the danger of scorch at "dead spots".

For shorter tapers and tapers, the gap between the taper and the broadening can be designed to remain constant over a certain length.

Optionally, the taper may also be designed such that it transitions into the broadening.

The gap may also show a plurality of tapers and subsequent broadenings between both front faces of the dispersion rings.

The use according to the invention of a single dispersion ring with a single planetary roller extruder section can already deliver a considerable contribution to the mastication.

The dispersion ring preferably prevents the passage of elastomers above the central spindle.

All of the feedstock is pressed in the extruder through the narrow gap between the central spindle and the dispersion ring, arising from the fact that a groove had been worked into the central spindle, into which projects the dispersion ring, whereby a distance from the opposite sides of the groove is maintained on all sides.

The gap widths, based on the construction size of the extruder, have the following exemplary dimensions:

| Construction size | Gap width | Variations plus/minus |
|---|---|---|
| 50 mm | 1.5 mm | 1 mm/0.5 mm |
| 70 mm | 1.4 mm | 1 mm/0.75 mm |
| 100 mm | 1.6 mm | 1 mm/0.75 mm |
| 150 mm | 1.8 mm | 1 mm/0.75 mm |
| 180 mm | 2.5 mm | 1.5 mm/1 mm |
| 200 mm | 2 mm | 2 mm/1 mm |
| 250 mm | 3 mm | 1.5 mm/1.5 mm |
| 280 mm | 3.5 mm | 2 mm/1.5 mm |
| 300 mm | 3 mm | 1.5 mm/1.5 mm |
| 350 mm | 4 mm | 1.5 mm/1.5 mm |
| 400 mm | 3.5 mm | 2 mm/2 mm |

The construction size is derived from the pitch diameter of the inner toothing of the housing.

The required components of the mixture are mixed in after the rubber and comparable elastomers have been masticated.

For those components of the mixture which are added together with the rubber or with the comparable elastomers into the feed part of the extruder, the blending occurs automatically. For those components of the mixture which are added only after the mastication, their blending with the rubber or with the elastomers begins only when they are added.

After the mastication and the previously added components of the mixture have been blended in, there is no need for a dispersion ring for mastication. Nonetheless, subsequent use of a dispersion ring or a plurality of dispersion rings may be advantageous in order to improve the dispersion and homogeneity of the components of the mixture in the masticated rubber or in the elastomers.

The dispersion ring used to disperse the components of the mixture may have the same or different design and different dimensions than the dispersion rings used to masticate rubber.

After mastication and after other components of the mixture have been blended in, the mixture is preferably further processed in the extruder and optionally with additional dispersion rings until inclusions are no longer observed in compressed compound samples of 1 mm thickness or less.

This also applies when additional components of the mixture are added after the mastication step.

The additional dispersion rings are then placed at a distance of preferably more than 2D from the feed point of the additional material, but the distance may also be more than 3D and even more than 4D.

The feedstock of rubber or comparable elastomers used for the extrusion is preferably in granulated form. Other added materials (including plasticizers, fillers, stabilizers etc.) also exist in granulated form, as flakes, chips, discs, filaments and agglomerates and other particles, sometimes also in liquid form. Hereinafter, the solid feedstocks refer only to particles. This includes all forms of the feedstock, also mixtures of various forms.

The elastomers are preferably kneaded in the path up to the dispersion ring and simultaneously subjected to strong cooling.

In order to realize the kneading without melting, the planetary roller extruder section according to the invention is set up, such that the material deformation is limited to the kneading.

To set up the kneading the following can be modified on the planetary roller extruder:
a) the clearance between the moving planetary roller parts
b) the number of planetary spindles
c) the toothing of the planetary roller parts Re a) The clearance between the moving planetary roller parts determines the degree of deformation to which the particle is subjected as it arrives between the teeth of the planetary roller parts. The smaller the clearance, the higher the deformation. The greater the clearance, the lower the deformation.

Re b) The particular aspect of planetary roller extruders or planetary roller extruder sections in comparison to extruders and extruder sections of other designs is that in addition to an extreme deformation power there is a free volume between the planetary spindles that rotate around the central spindle. The material can flow into the free volume. The free volume is controlled by modifying the number of planetary spindles. The lower the number of planetary spindles, the larger the free volume.

Re c) The toothing can have different configurations.

Besides the usual conventional toothing or standard toothing, Igel toothing and Noppen spindles are also known. Both types of toothing preferably result from the standard toothing by interrupting the teeth that extend like a thread around the spindles.

Standard toothing of planetary spindles is characterized on the one hand by a cross section, as is shown by the intermeshing teeth of gear wheels of a gear unit. On the other hand the teeth do not run straight but rather in a spiral path along the periphery or like the threads of a screw thread.

The threads are also cut in this shape, e.g. turned or milled, into the starting material of the planetary spindles.

The threads are differentiated into left-handed and right-handed threads. There are also multiple threads.

The same differentiation is found with extruder spindles.

A Noppen toothing results if e.g. a left-hand running groove, similar to a thread, is worked into a right-handed toothing. The groove interrupts the threads of the planetary spindles. The groove can have the same or a different (smaller or larger) lead than the toothing of the spindles. The lead of the groove preferably deviates by at most 50% from the lead of the toothing.

In the Igel spindle the conventional toothing is interrupted by annular grooves on the periphery of the spindle. The intermittent toothing may be limited to individual planetary spindles as well as to parts of the planetary spindles. The intermittent toothing may be provided in a plurality or in all planetary spindles.

With a Noppen toothing on the planetary spindles it may be preferred to locate the conventional toothed part of the planetary spindles in the conveying direction of the extruder at the rear end (on the discharge end of the planetary roller part) in order to build up a conveying pressure there that ensures that the material will be transferred into the further zone of the extruder.

Optionally, planetary spindles with intermittent toothing may alternate with conventionally toothed planetary roller spindles.

Optionally, individual conventionally toothed planetary spindles may also be arranged between planetary spindles with intermittent toothing or vice versa.

Insofar as the gaps in the toothing are provided in a plurality of corresponding planetary roller parts, then the toothing may be arranged, such that the gaps in the toothing in one planetary roller part align with the gaps in the corresponding planetary roller part or are offset with respect to these gaps. The degree of the offset may be equal to a fraction of the tooth gap between two teeth or a multiple of the tooth gap between two teeth, wherein a multiple may also be a number less than 2.

The gaps in the teeth result in openings, into which the elastomers may flow.

The free volume described under b) and the intermittent toothing described under c) reduce the conveying pressure emanating from the planetary roller parts, such that the feedstock may remain in the extruder or in the extruder section for a sufficient time required for degassing.

The extruders preferably have a modular design. Consequently, modules of different designs and different functions can be combined with one another. This enables the extrusion unit to perform different tasks in one line.

Moreover, identical modules or identical modules that differ only in length can be connected together in order to create a defined processing path.

The kneading in the extruder or in the extruder section/module generates considerable energy that heats up the feedstock.

Adequate cooling is achieved with conventional temperature control devices on the planetary roller extruders. The housing usually has a double wall design and the temperature control agent is fed through the intermediate space. Also, the central spindle is usually equipped with channels, through which the temperature control agent likewise flows. For cooling, the usual temperature control agent is water.

Water cooling enables the extruder to operate at relatively low temperatures, such that temperature-sensitive elastomers can also be processed. The intensity of the cooling is such that the temperature of the feedstock between the feed part and the dispersion ring can be maintained below 120° C., preferably even below 115° C. and even more preferably below or equal to 110° C.

It is also advantageous if the temperature of the feedstock between the feed part and the dispersion ring can be reduced by at least 2° C., preferably by at least 4° C., even more preferably by at least 6° C. and most preferably by at least 8° C.

The optimal temperatures in the context of the invention are material-dependent. Many elastomers, especially natural rubbers, can be processed with a temperature of up to 120° C., without this heat contributing to a significant molecular degradation during the mastication of the elastomer. Elastomers that can be processed at a higher temperature include butyl rubber as a synthetic rubber with a processing temperature up to 160 or 170° C.

The elastomer temperature or melt temperature has to be distinguished from the cylinder temperature. The high energy input during the mastication in the extruder releases a correspondingly large amount of heat that has to be removed by cooling the inner toothed housing or the inner toothed housing liner. Cooling the central spindle is also helpful in this respect.

The housing or the liner is cooled by means of a coolant, for example water, which is made to flow through appropriate cooling channels that are provided in the housing or between the housing and the liner. In this way a sufficient amount of heat is absorbed through the inner toothing of the planetary roller extruder and the external toothing of the central spindle, for the temperature there to be less than half the melt temperature.

The rotational speed of the central spindle may also be reduced to maintain the desired melt temperature. This is synonymous with a reduction of the energy input.

The feed part usually has a screw.

This type of construction is therefore referred to as a single-screw.

The combination of a single-screw with planetary roller extruder modules represents part of the proven state of the art. Here the various planetary roller extruder modules have a common central spindle that continues as a screw into the feed part.

In the homogenization zone the temperature of the feedstock is additionally maintained in the range pre-defined for the processing path between the feed part and the dispersion ring. Advantageously, the temperature that was reached directly before the dispersion ring is kept steady.

Planetary roller extruders are preferably provided in the homogenization zone. In this regard the conveying action, material residence time and the homogenization can be influenced by the choice of the planetary spindles. To influence these parameters, the applicant has developed planetary spindles with various toothing designs. They include standard spindles, Igel spindles, Noppen spindles and Transport spindles.

Standard spindles are equipped with a constant toothing over the whole length.

Igel spindles are usually produced from a standard toothing. Here, annular grooves are worked periodically into the standard toothings.

Noppen spindles are also usually produced from a standard toothing. In addition to a left-handed toothing, a right-handed toothing is cut into the standard spindles. Conversely, a left-handed toothing can also be cut into standard spindles that have a right-handed toothing.

The obtained counter-rotating toothing results in openings in the teeth. Knob-like parts are left over from the original teeth. This resulted in the name "Noppenspindel". Transport spindles are also produced from standard spindles. At least one tooth is removed from at least one standard spindle. Optionally, more teeth are also removed. Preferably at least 3 remain evenly on the periphery of each of the planetary spindles. Each fourth or each third or each second tooth may also be removed. This concerns a reduced number of teeth in contrast to a non-reduced number of teeth. The teeth are preferably removed down to the tooth root. It is also conceivable to remove more material or to remove parts of the teeth.

The total or partial removal of certain teeth with an unchanged presence of the other teeth affords a planetary spindle with more conveying action than an unadulterated Noppenspindle, but also with less mixing power than an unadulterated Noppenspindle. Compared with a standard spindle, however, the conveying action is lower and the mixing power is higher. Nonetheless, after having reduced the number of teeth on the planetary roller spindles, the same conveying action of the extruder can be obtained, for example, by increasing the number of planetary spindles. This results in a greater number of planetary spindles.

Surprisingly, the removal of the teeth does not impair the smooth operation of the planetary spindles because the teeth, like screws/threads, run on the surface of the planetary spindles. With an adequate length of the spindles and an appropriate pitch the screw-shaped or thread-shaped running teeth wind so frequently around the spindles, such that the planetary spindles are safely guided and fixed between the central spindle and the surrounding housing. For a planetary spindle, in which every second tooth has been removed, then
a) for a planetary spindle diameter of less than 160 mm an inventively machined spindle length of at least 200 mm is provided, preferably at least 300 mm and more preferably a spindle length of at least 400 mm and most preferably a spindle length of up to 800 mm. With fewer removed teeth the spindle length can be shorter, with more removed teeth the spindle length should be longer.

b) for a planetary spindle diameter of 160 mm and more a spindle length of at least 400 mm is provided, preferably at least 800 mm and more preferably a spindle length of at least 1200 mm and most preferably a spindle length of up to 2500 mm. With fewer removed teeth the spindle length can be shorter, with more removed teeth the spindle length should be longer.

The machining of the planetary spindles can be applied to all known tooth modules, especially to the common modules 1.5 to 12 or beyond up to 20. The tooth modules are to be differentiated from the abovementioned planetary roller extruder sections/modules. The tooth modules characterize the size of the teeth. The planetary roller extruder sections/modules are combined with the other modules to form the relevant desired extruder. The modular design is comparable with a construction kit and is generally very economical.

The various planetary parts (central spindle/planetary spindles/inner toothing) of a section/module frequently have the same tooth module.

Optionally, the teeth are not subsequently removed; rather the planetary spindles are manufactured to already have the same shape as that obtained from the above described tooth removal.

In this regard, let us first consider how the teeth are obtained in conventional toothing. Milling and grinding are widely used production techniques. The contour of the toothing is then defined and the milling tool moves along the contour. In this regard, the milling tool works relatively coarsely. Therefore a subsequent finishing step is usually carried out, e.g. usually by grinding for externally toothed parts or by honing or eroding for inner toothed parts. Manufacturing processes for shaping gear parts by casting and sintering are also known. The manufacturing processes for shaping include forging, pressing, drawing, rolling, stamping. Milling is a machining process. Other machining processes are for example planing, slotting, broaching, shaving, grinding, honing.

It is common to all toothing production processes that the defined contour of the toothing is followed. In normal toothing a tooth alternates with a tooth gap. The distance between two neighboring teeth in a part is equal. The toothing depends on the defined contours. The toothing follows the general principles of gear technology.

Various basic types of toothing exist: involute toothing, cycloid toothing and bolt toothing.

Moreover, there are diverse special forms.

Involute toothing has gained acceptance for planetary roller extruders. Involute toothing with a full complement of teeth is hereinafter called normal toothing.

In involute toothing the flanks of the teeth of the toothed wheel are formed from involutes. One way to imagine the involutes is to consider the base circle of the toothed wheel as a solid cylinder, around which a thread is wound. If this thread is now unwound then the tightly stretched end point of the thread describes the figure of an involute. All points on the thread which exhibit an integral multiple of the distance from the end point thus move on the involute of another tooth. The involute toothings have the following advantages: The flanks of two intermeshed toothed wheels are always in contact, and in these contact points they always have approximately the same speed. This ensures that the rotational movement is transferred with low friction.

At the same time, the involute toothing enables a uniform transfer of torque due to a constant ratio.

It is insensitive to the displacement of the axes of the toothed wheels (independent of the center distance).

It is easily manufactured by standardized linear tools. With the same tooling geometry, toothed wheels with different numbers of teeth and a different profile shift are freely combinable with one another.

With planetary roller gears one strives, as with other gears, to work with the least possible clearance between the gear parts. The clearance can be taken into account when defining the contours. Usually, a very much greater clearance is intended for planetary roller extruders. The clearance can also be taken into account when defining the contours.

In normal toothing a tooth follows a tooth gap and a tooth gap a tooth, wherein the teeth and the tooth gaps are equal. As the teeth engage into the tooth gaps and the intermeshing/mutually engaging gear parts should have the same toothing, the tooth gaps represent an inverted mirror image of the teeth. In the toothing design according to the invention, however, the tooth gaps differ from the usual toothing. In the above described manufacture of the toothing according to the invention, single or a plurality of teeth are removed from the gear parts. Alternatively, single or a plurality of teeth are already removed when the tooth contours are defined. The defined teeth contour is then manufactured in the above described manner. This means, in the case where a milling machine is used, that the miffing machine follows the pre-defined, new contour with larger tooth gaps. The same applies for other tools for manufacturing the pre-defined, new contour.

Advantageously, the number of teeth of the housing inner toothing (liner toothing), the planetary spindles and the central spindle is chosen, such that the self-cleaning effect of the planetary roller parts is preserved. This is the case, for example, if the number of teeth on the central spindle and on the housing inner toothing (liner toothing) is an even number and the number of teeth on the planetary spindles is an odd number. The melt in each intermediate space between two teeth is then set in motion by the teeth of the other parts of the planetary roller extruder which penetrate into the intermediate space.

The same conditions are obtained with an odd number of teeth on the central spindle and the housing inner toothing, and an even number of teeth on the planetary roller spindles.

The same result can be achieved by an irregular removal of the teeth, for example by removing not every second tooth in a regular manner, but once or several times removing another tooth, for example the third tooth or for example leaving two originally adjacent teeth untouched. This means that the processing occurs in different gaps. Here it may be sufficient that one gap differs from the other gaps. A plurality of gaps may also be different.

The same result may also be achieved by combining the machined planetary roller spindles with un-machined planetary roller spindles or the differently inventively machined planetary roller spindles are combined with each other.

It may also be advantageous to use planetary roller spindles that possess different toothings along their length. Different toothings are then present on a planetary spindle. Thus, the planetary spindles may exhibit the above described machining along part of the length and are normally toothed in the other part or are designed as Noppen spindles or exhibit another toothing.

This may be due to the fact that the machine tools end at the transition from one zone into the other zone. In the combination with knob formation this means the contrary toothing, that in the above described form, the Noppen spindles, ends at the mentioned transition. Similarly, the machining ends in the transition from one zone into the others.

The multi-part planetary spindles may also possess a repeated change of toothing.

One-piece planetary spindles which show one or more changes of toothing along their length in the toothing may also be considered.

The embodiments for the subsequent removal of teeth and the pre-defined tooth contours correspondingly apply for each change of toothing. The mixtures manufactured with rubber or comparable elastomers can be used for numerous purposes, for example for the production of adhesive tapes, in that a thin film is made from the adhesive compound and deposited on a carrier strip.

DETAILED DESCRIPTION

Figure 1:
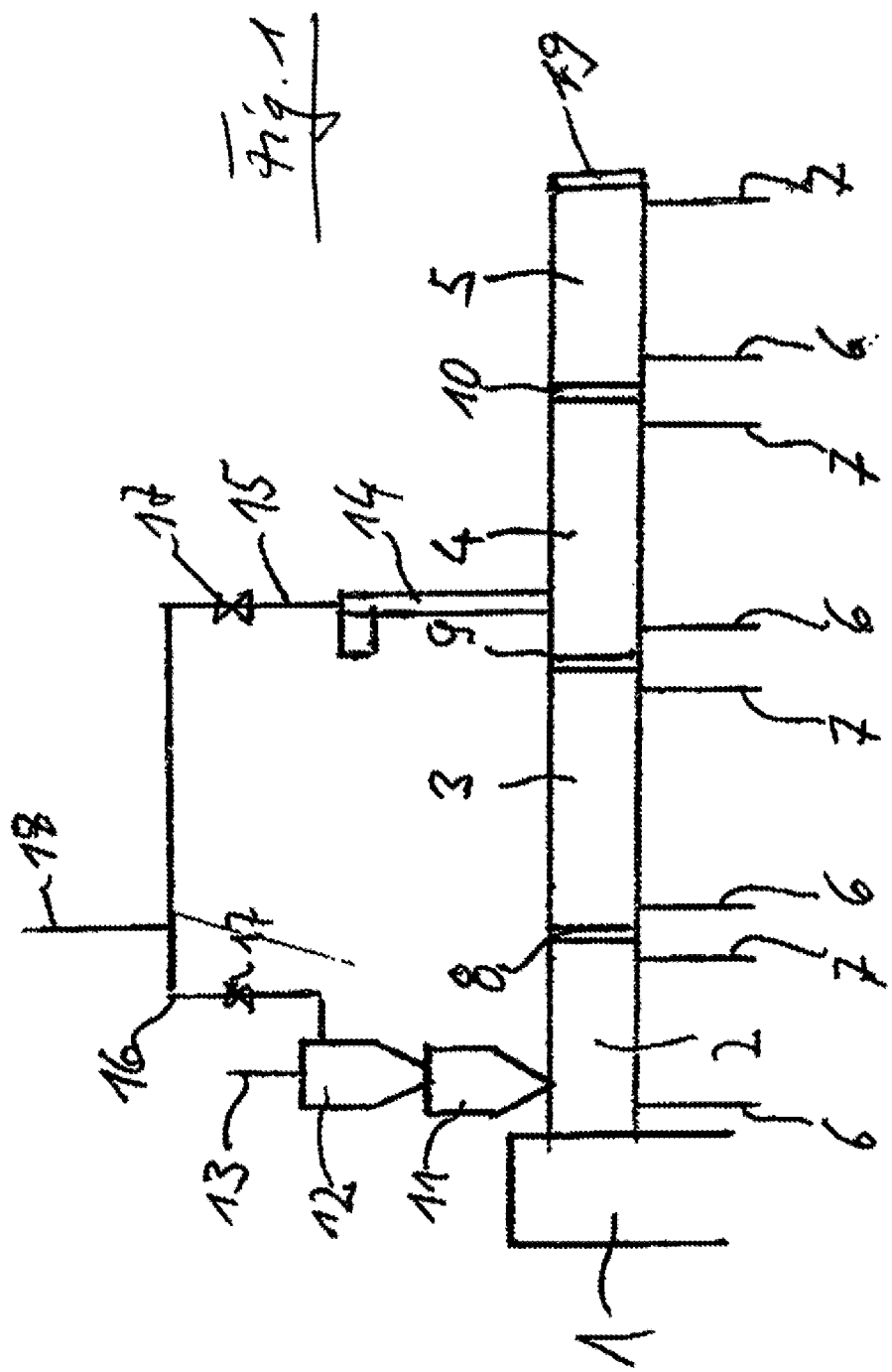
FIG. 1 is a schematic diagram of an exemplary extrusion unit.

An embodiment of the invention is illustrated in the drawing. The drawing shows in FIG. 1 an extrusion unit, consisting of a drive 1, a feed part 2, a planetary roller extruder module 3, a planetary roller extruder module 4 and a planetary roller extruder module 5. In the embodiment the modules 3, 4, 5 are each 400 mm long. Each module 3, 4, 5 possesses an externally toothed central spindle (not shown), externally toothed planetary spindles (not shown) and a housing with an inner toothed liner. The planetary spindles mesh with the toothing of the liner and simultaneously with the toothing of the central spindle. The toothing is a helical toothing, here an involute toothing, such that the individual teeth run correspondingly with the pitch of the teeth to the longitudinal axis of the extruder like screw threads on the toothed surfaces.

All the modules 3, 4, 5 possess a common central spindle that continues as a feed-screw in the feed part. This means that a common central spindle penetrates all the modules and forms the feed screw in the feed part 2 designed in the form of a single-screw extruder. Moreover, one end of the central spindle is connected to the drive 1.

The housings of all the modules and the feed part are equipped with a temperature control system. In the embodiment water serves as the temperature control agent. The temperature control agent flows in channels between the housing and the liner that is seated therein. The channels are created by grooves on the periphery of the liners and which run like screw threads on a screw. The grooves become channels when the liners are pushed into the housing. The temperature control agent is fed through supply lines 6 to the channels and through pipes 7 from the channels to a heat exchanger, in which, as needed, heat is supplied to or removed from the temperature control agent.

The housings of the modules 3, 4, 5 and of the feed part 2 have a cylindrical design and are equipped on both ends with a collar. The collar serves to connect the housings together. The connection between the feed part 2 and the module 3 is identified with 8.

The planetary spindles are held in position in the machine direction of the extrusion unit by slide rings. In the embodiment the slide rings are held at the coupling joints 9 and 10 of the modules 3, 4, 5 between the housing ends. The slide ring of the planetary spindles of module 5 is held at 19 between the associated end and an extrusion die (not shown). Incidentally, the planetary spindles are held between the central spindle and the surrounding liner.

The slide ring at position 9 between the modules 3 and 4 serves not only to position the planetary spindles but in the embodiment also a special ring construction with a dispersion ring. The dispersion ring is made of two halves that can be inserted into a corresponding recess of the ring construction. The dispersion ring is inserted after positioning the ring construction with the slide ring. The dispersion ring engages into a groove (not shown) of the central spindle. The dimensions of the groove are greater than those of the part of the dispersion ring that engages into the groove. After having inserted the dispersion ring there thus remains a gap, through which the feedstock must flow. The ring construction, as the usual slide rings, is clamped between the ends of the modules/ends of the housing.

An airtight lock is mounted on the feed part 2. The lock is made of two hopper-shaped chambers 11 and 12. The lower chamber 11 is connected to the feed opening. A dosing device in the form of a toothed wheel air lock is provided between the lower chamber 11 and the feed opening. The upper chamber 12 possesses a connection to the lower chamber. A slider is provided at the connection point. The feedstock is supplied to the upper chamber through a pipeline 13. Another slider is provided at the entrance into the upper chamber. The sliders enable an airtight closure of the chamber 12.

The chamber 12 is also connected to a suction line 16. Another slider 17 is provided in the suction line 16. The air enclosed in the chamber 12 can be partially suctioned off with the device. A side-arm extruder 14 is mounted on the module 4. The side-arm extruder 14, by standing vertically above the module 4, differs from the conventional horizontal position. Moreover, the side-arm extruder does not serve to feed in material, but rather serves for degassing. For this, the side-arm extruder 14 runs empty in the operational mode.

A suction line 15 as attached to the side-arm extruder. Just as in the suction line 16, a slider 17 is provided in the suction line 15. Both suction lines 15 and 16 run into a common suction line 18.

The feedstock is introduced into the unit with the feed part 2. In the embodiment for producing a PSA the feedstock includes acrylic polymers as the elastomer and diverse additives. The feedstock initially arrives into the chamber 12. There, the air that was entrained with the feedstock into the chamber 12 is essentially suctioned off. During the extraction by suction the chamber 12 is sealed from the chamber 11 and the supply line 13.

After a desired reduced pressure in the chamber 12 has been achieved, the chamber 12 is opened, such that the material may flow into chamber 11. After the chamber 11 has been filled the chamber 12 is again sealed from chamber 11. The material is dosed from chamber 11 into the feed part 2. The feed screw in the feed part compresses the material and presses it into the module 3. The material is kneaded therein at a temperature between 100 and 120° C. by the planetary spindles. The kneading step is essentially determined by the toothing of the module parts. In the embodiment all parts have a standard toothing.

After being processed in the module 3 the material is pressed through the gap at the dispersion ring. This is associated with a high mechanical deformation of the elastomers. The elastomers are masticated, such that the additives can be permanently blended into the elastomers. At the same time degassing is carried out by the side-arm extruder 14 that is designed as a twin-screw extruder. In other embodiments a planetary roller extruder is provided as the side-arm extruder. However, a single-screw extruder is also suitable for use as the side-arm extruder that fulfils the subsequent conditions.

The side-arm extruder 14 runs empty. The side-arm extruder serves to thrust back the material under pressure in module 4 and any material that surges through the housing opening. The side-arm extruder has also to evacuate the released gas. The side-arm extruder is thus gas permeable. This is achieved by a correspondingly large clearance between the two screws in the side-arm extruder housing surrounding the screws. Planetary roller extruders and single-screw extruders can be configured to be exactly as gas permeable as the twin-screw extruder.

For the degassing, a suction line 15 is attached to the side-arm extruder. The induced draft is controlled by the valves provided in the suction lines 15 and 16, such that the reduced pressure of the induced draft is made to remain within acceptable limits independently of the source of the induced draft. The processing of the material in the modules 4 and 5 is known as homogenization. In this regard, only standard toothing is provided in module 4. The module differs only in its planetary spindles. The above described transport spindles are provided there.

In other embodiments degassing also occurs between the modules 4 and 5 and optionally between additional modules. At these positions ring constructions are provided, which have still more additional functions than a thrust ring, namely a degassing function. For this the ring construction has an annular degassing channel that opens in the downstream direction of the material, i.e. towards the inner space of the module 5. During extrusion, due to the partial filling of the module, a cavity is formed there that is suitable for the degassing. Moreover, the ring construction/annular space is connected to a suction line. The suction line can be easily guided between the ends of the modules 4 and 5.

Figure 2:
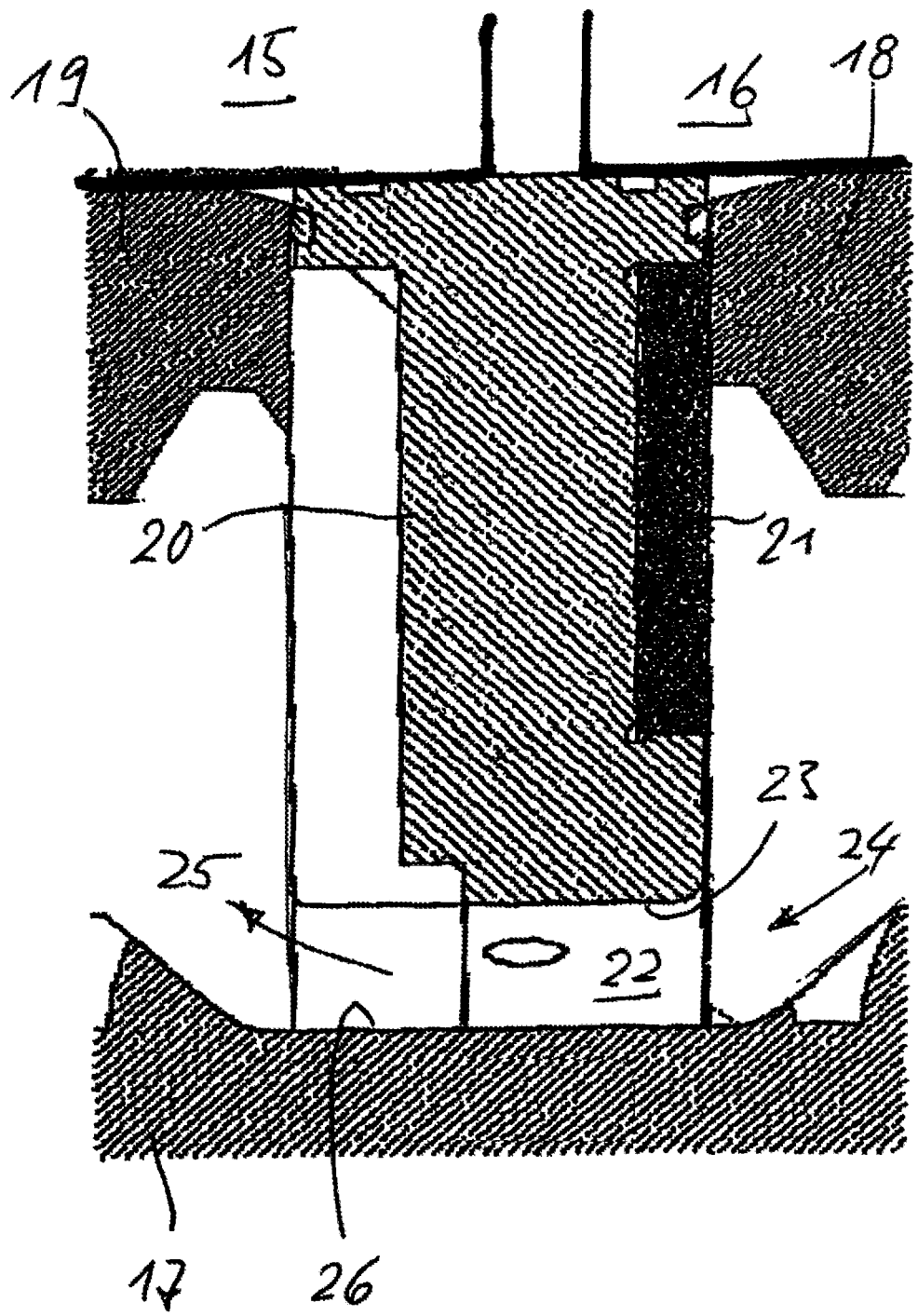
FIG. 2 is a cross sectional view of an exemplary dispersion ring.

FIG. 2 shows a detail of a ring construction between two modules. The ring construction is clamped between adjacent housing ends 15 and 16 of the modules. Inner toothed liners 18 and 19 are seated in the housing ends 15 and 16. The liners 18 and 19 are recessed somewhat in the housing ends 15 and 16 and leave a space that is filled by a ring construction 20. The ring construction 20 consists of two halves that are combined around the already installed central spindle 17 to form a ring before installing the housing with the end 15. The ring construction 20 engages into a groove of the central spindle 17. An annular gap remains between the outer periphery 23 of the ring construction 20 and the base 26 of the groove. The annular gap is composed from an entry-side taper 24, a constant passage 22 and a discharge-side broadening 25.

At the same time the ring construction 20 forms a thrust ring and a dispersion ring. As the thrust ring the ring construction 20 forms a support for carbide annular parts 21. During the operation of the extruder the planetary spindles (not shown) slide with their front face on the carbide annular parts 21. During the operation of the extruder the planetary spindles run in the free volume between the inner toothed liners 18 and 19 and the outer toothed central spindle 17. In this regard the planetary spindles in the free volume of the inner toothed liner 18 come into contact with the carbide ring parts 21, whereas the planetary spindles in the free volume of the inner toothed liner 19 circulate at a distance from the ring construction 20. In the view shown in FIG. 2 the feedstock flows from right to left. As the dispersion ring, the ring construction has the task of distributing additive components in the compound. Here, the compound is a rubber or a comparable elastomer that is to be masticated, in order for the added components to be initially dispersed as desired.

The compound is pressed through the illustrated annular gap and is thus subjected to a considerable deformation, which together with the deformation from the repeated rolling of the compound between the teeth of the planetary roller extruder module, causes a mastication of the rubber or other comparable elastomers.

The invention claimed is:

1. A method for processing natural rubber and/or non-thermoplastic elastomers which require mastication before they can be blended with other components of a mixture, comprising:
   providing an extrusion unit that is composed of two planetary roller extruder modules having a longitudinal axis,
     wherein a common central spindle extends through both of the planetary roller extruder modules, the common central spindle having an external toothing,
     wherein each of the two planetary roller extruder modules comprises
       planetary spindles with external toothing that rotate about the common central spindle, and
       a surrounding housing having an internal toothing,
     wherein the planetary spindles mesh with both the common central spindle toothing and with the internal toothing of the housing,
     wherein the toothings are helical toothings, such that individual teeth, in accordance with a pitch of the teeth to the longitudinal axis of the extruder, run like screw threads on toothed surfaces, and
     wherein a dispersion ring is arranged between the surrounding housings of the two planetary roller extruder modules, and
     wherein the dispersion ring engages a groove of the common central spindle and leaves an open passage in the groove;
   kneading a feedstock of natural rubber and/or non-thermoplastic elastomers between the teeth of the planetary roller extruder module and
   subjecting the feedstock to deformation in the dispersion ring so as to masticate the feedstock until it exhibits a Mooney viscosity of less than 80 in order to allow other components of the mixture to be compounded in; and
   cooling the feedstock during mastication.

2. The method as in claim 1, wherein a gap having a gap width is formed between the dispersion ring and the groove of the common central spindle, and wherein the gap width and a variation of the gap width are based on a construction size of the extruder as follows:

| Construction size | Gap width | Variations plus/minus |
|---|---|---|
| 50 mm | 1.5 mm | 1 mm/0.5 mm |
| 70 mm | 1.4 mm | 1 mm/0.75 mm |
| 100 mm | 1.6 mm | 1 mm/0.75 mm |
| 150 mm | 1.8 mm | 1 mm/0.75 mm |
| 180 mm | 2.5 mm | 1.5 mm/1 mm |
| 200 mm | 2 mm | 2 mm/1 mm |
| 250 mm | 3 mm | 1.5 mm/1.5 mm |
| 280 mm | 3.5 mm | 2 mm/1.5 mm |
| 300 mm | 3 mm | 1.5 mm/1.5 mm |
| 350 mm | 4 mm | 1.5 mm/1.5 mm |
| 400 mm | 3.5 mm | 2 mm/2 mm |

3. The method as in claim 1,
wherein the feedstock is natural rubber and
wherein the natural rubber is cooled to below 140° C. during mastication.

4. The method as in claim 1,
wherein the feedstock is a non-thermoplastic elastomer and
wherein the feedstock is cooled to below a temperature which, if exceeded, would cause the feedstock to suffer a significant molecular degradation in the absence of mechanical deformation and without chemical mastication agents in a presence of ambient air.

5. The process according to claim 1, wherein the internal toothing of the housings is cooled to a temperature which is no higher than half of a melt temperature in the extruder.

6. The method as in claim 1, wherein the mastication is carried out in the absence of oxygen or in an oxygen-depleted atmosphere.

7. The method as in claim 6, wherein oxygen surrounding the feedstock is at least partially replaced with an inert gas.

8. The method as in claim 1, further comprising: adding at least one non-meltable solid after the natural rubber and/or the non-thermoplastic elastomers have been masticated.

9. The method as in claim 8, further comprising: introducing additional components to the feedstock through a side-arm extruder after the natural rubber and/or the non-thermoplastic elastomers have been masticated.

10. The method as in claim 8, wherein the natural rubber and/or the non-thermoplastic elastomers and the at least one non-meltable solid which has been added after the mastication are dispersed and homogenized by further processing in the extruder and by further processing through at least a second dispersion ring.

11. The method as in claim 10, wherein a distance between a feed part through which the non-meltable solid is added and the second dispersion ring is at least 2D, with D being a pitch diameter of the internal toothing in the surrounding housing.

12. The method as in claim 1, further comprising: degassing the feedstock in the extruder prior to mastication.

13. The method as in claim 12, comprising at least one additional degassing step after additional components have been introduced to the feedstock after mastication.

14. The method as in claim 12, wherein degassing is performed by a side-arm extruder that runs empty.

15. The method as in claim 12, wherein degassing is performed by degassing rings that are arranged between two consecutively arranged planetary roller extruder modules.

16. The method as in claim 12, further comprising: checking the dispersion and degassing by visually inspecting a compound sample for inclusions, wherein the compound sample is compressed to a layer thickness of less than 1 mm before inspection thereof.

17. The method as in claim 1, wherein the feedstock comprises dry rubber and/or a non-thermoplastic elastomers and no more than 15 wt % of a liquid slip agent.

18. The method as in claim 1, wherein mastication occurs in absence of a solvent.

* * * * *